United States Patent
Kim

(10) Patent No.: US 8,157,064 B2
(45) Date of Patent: Apr. 17, 2012

(54) SHOCK ABSORBER FOR DRAWER

(75) Inventor: Jaehong Kim, Seoul (KR)

(73) Assignee: Moonju Hardware Co., Ltd., Incheon (KR)

( * ) Notice: Subject to any disclaimer, the term of this patent is extended or adjusted under 35 U.S.C. 154(b) by 993 days.

(21) Appl. No.: 12/155,126

(22) Filed: May 29, 2008

(65) Prior Publication Data

US 2009/0223759 A1 Sep. 10, 2009

(30) Foreign Application Priority Data

Mar. 5, 2008 (KR) .................. 10-2008-0020681

(51) Int. Cl.
*F16F 9/48* (2006.01)

(52) U.S. Cl. ............. 188/286; 188/283.1; 188/288; 188/282.1; 188/322.22

(58) Field of Classification Search .......... 188/381, 188/271, 281, 284, 288, 322.22, 316
See application file for complete search history.

(56) References Cited

U.S. PATENT DOCUMENTS

| | | | | | |
|---|---|---|---|---|---|
| 3,937,450 | A | * | 2/1976 | Bauer | 267/113 |
| 5,074,389 | A | * | 12/1991 | Slocum | 188/277 |
| 5,169,131 | A | * | 12/1992 | Shimura | 267/221 |
| 5,579,874 | A | * | 12/1996 | Jeffries et al. | 188/282.9 |
| 5,697,477 | A | * | 12/1997 | Hiramoto et al. | 188/322.18 |
| 5,702,091 | A | * | 12/1997 | Perrin et al. | 267/64.12 |
| 5,884,734 | A | * | 3/1999 | Hiramoto et al. | 188/322.18 |
| 7,549,519 | B2 | * | 6/2009 | Atwater et al. | 188/381 |
| 7,628,257 | B1 | * | 12/2009 | Lu | 188/282.6 |
| 7,861,371 | B2 | * | 1/2011 | Kim | 16/85 |
| 2007/0251052 | A1 | * | 11/2007 | Pyo | 16/86 A |

FOREIGN PATENT DOCUMENTS

KR 10-2006-0094249 A * 8/2006
* cited by examiner

*Primary Examiner* — Bradley King
*Assistant Examiner* — Thomas Irvin
(74) *Attorney, Agent, or Firm* — Staas & Halsey LLP

(57) ABSTRACT

Disclosed is a shock absorber for a drawer. The shock absorber includes a body filled with fluid, a piston member inserted into the body while being coupled with a rod, and a buffering member installed in the body to prevent the body from being broken by receiving pressure change of fluid when the piston member moves forward and backward. According to the shock absorber, high impact force generated when the drawer is closed can be absorbed and efficiently distributed, so that the drawer can be silently operated.

7 Claims, 11 Drawing Sheets

SHOCK ABSORBER FOR DRAWER

CROSS-REFERENCE TO RELATED PATENT APPLICATION

This application claims the benefit of Korean Patent Application No. 10-2008-0020681, filed on Mar. 5, 2008, in the Korean Intellectual Property Office, the disclosure of which is incorporated herein in its entirety by reference.

BACKGROUND

1. Field

The present invention relates to a shock absorber for a drawer. More particularly, the present invention relates to a shock absorber for a drawer, which can be silently operated by absorbing impact generated when a drawer is dosed.

2. Description of the Related Art

In general, a shock absorber for furniture allows a door or a drawer to be smoothly dosed by absorbing impact generated when the door or the drawer is opened or dosed, thereby reducing noise and impact.

Korean Patent Registration No. 10-0663751 filed by present applicant discloses one example of a shock absorber for furniture.

In brief, Korean Patent Registration No. 10-0663751 discloses a damper for furniture that comprises a body. The body has a fluid sealing, which is formed with holes in the center portions thereof, and a fixing member at both sides thereof, and a fluid chamber therein. Further, first and second rods are coupled with both sides of the fluid chamber of the body while interposing a check guide and a check valve therebetween. The fluid chamber includes an inclination section that has an inner wall with a predetermined slope at the left end thereof. Further, at least one cutting groove having a predetermined depth is formed in the inner wall of the inclination section.

However, the cited art may not sufficiently attenuate impact force.

SUMMARY

Additional aspect and/or advantages will be set forth in part in the description which follows and, in part, will be apparent from the description, or may be learned by practice of the invention.

Accordingly, the present invention has been made to solve the above-mentioned problems occurring in the cited art. An embodiment of the present invention is to provide a shock absorber for a drawer, which can be silently operated by forming a first section for absorbing and decreasing initial strong impact, a second section for further reducing the impact, and a third section for enabling the drawer to be closed in a no-load state.

According to one aspect of the present invention, there is provided a shock absorber for a drawer including: a damping section filled with fluid and primarily absorbing impact; a body including a deceleration section, which secondarily absorbs the impact, and a no-load section in which no impact exists; a buffering member inserted into the body to receive the fluid-pressure; and a piston member coupled with a piston rod, which passes through the buffering member, and installed in the body to press the buffering member, wherein the piston member passes through the damping section, the deceleration section and the no-load section.

The damping section has a tapered portion in such a manner that the inner diameter of the damping section is reduced from the opening to an inner side of the body, and a plurality of first guide protrusions are radially formed on the tapered portion.

A diameter of the damping section defined by the first guide protrusions is identical to an inner diameter of the piston member.

The inner diameter of the deceleration section is identical to the diameter of the damping section defined by the first guide protrusions.

The no-load section has an inner wall portion in which the inner diameter of the inner wall portion is increased toward the rear end of the body, and a plurality of second guide protrusions are formed along the circumferential surface of the inner wall portion.

A diameter of the damping section defined by the second guide protrusions is identical to the inner diameter of the piston member.

The buffering member includes an expandable member, which is formed with a through hole at the center portion thereof, a packing member, which is formed with a through hole at the center portion thereof while closely making contact with one end of the expandable member, and a cover formed with a through hole at the center portion thereof and doses the front opening of the body.

The piston member includes a rod, which passes through the center of the buffering member, a stopper, which is coupled with the rod while supporting the expandable member of the buffering member, and a piston support and a piston coupled with the rear end of the rod.

According to an aspect of the present invention, high impact force generated when a drawer is dosed can be absorbed and sequentially distributed, so that the drawer can be silently operated.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Figure 1:
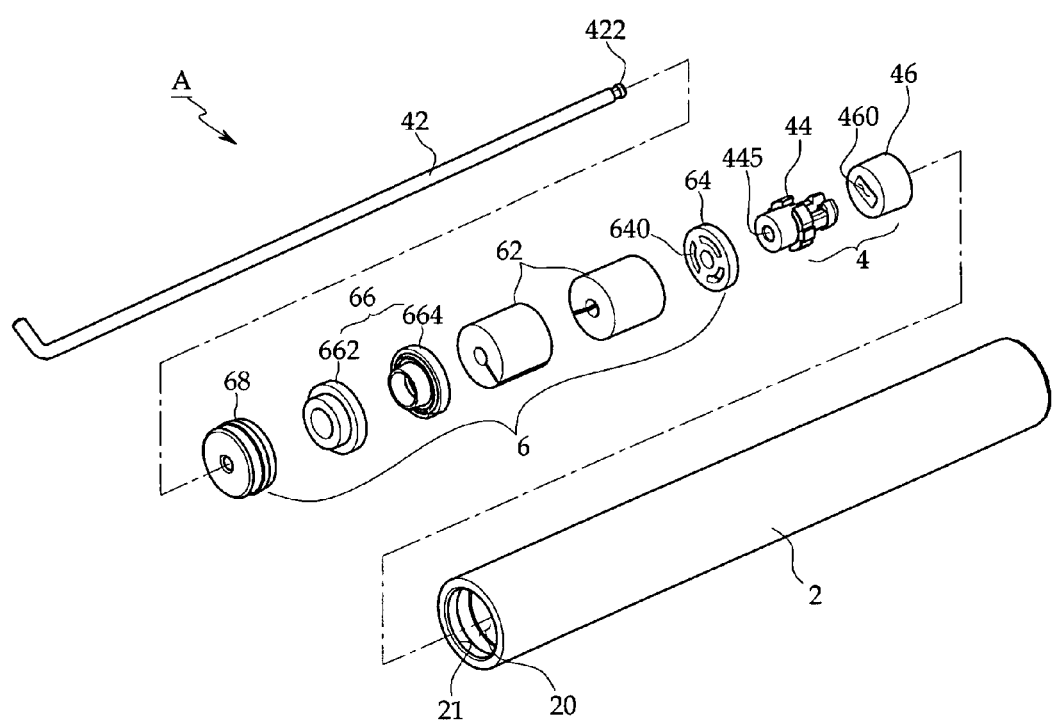
FIG. 1 is an exploded perspective view illustrating a shock absorber for a drawer according to an aspect of the present invention.

Reference will now be made in detail to the embodiments, examples of which are illustrated in the accompanying drawings, wherein like reference numerals refer to the like elements throughout. The embodiments are described below to explain the present invention by referring to the figures.

Figure 2:
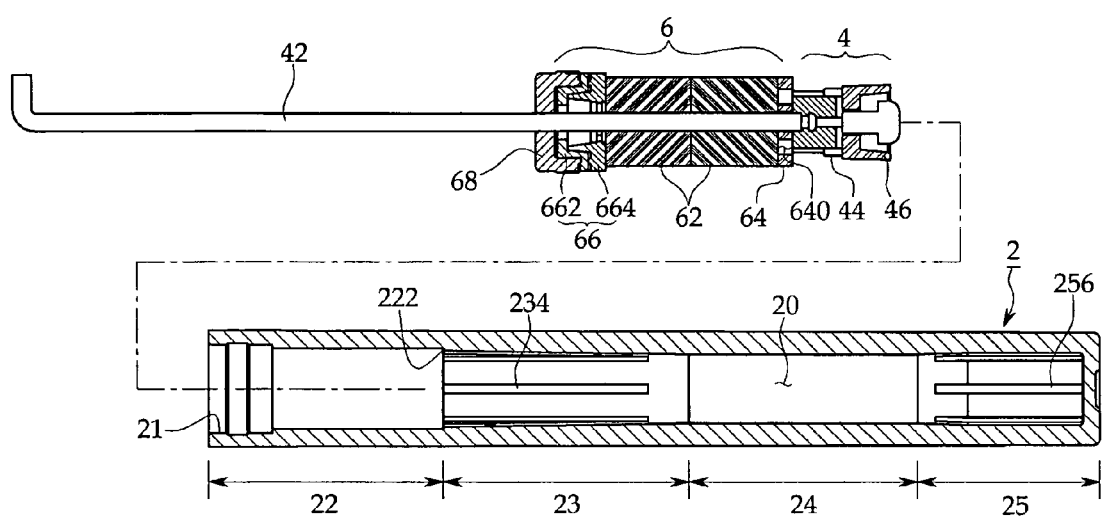
FIG. 2 is an assembled perspective view illustrating a shock absorber for a drawer according to an aspect of the present invention.

FIG. 1 is an exploded perspective view illustrating a shock absorber for a drawer according to an aspect of the present invention, and FIG. 2 is an assembled perspective view illustrating the shock absorber for a drawer according to the present invention.

As illustrated in FIGS. 1 and 2, the shock absorber A for a drawer according to the present invention includes a body 2 filled with fluid, a piston member 4 and a buffering member 6. The piston member 4 is inserted into the body 2 while being coupled with a rod 42. The buffering member 6 is installed in the body 2 to prevent the body 2 from being broken by receiving pressure change of fluid when the piston member 4 moves forward and backward.

Referring to FIG. 2, the body 2 has a cylindrical shape and a space section 20 filled with fluid. Further, the body 2 has a front end, at which an opening is formed, and a closed rear end.

The fluid includes typical oil. Preferably, the fluid includes silicon oil.

The space section 20 of the body 2 includes an expanded section 22 in which the buffering member 6 is installed adjacently to the opening, a damping section 23, a deceleration section 24 and a no-load section 25 in which no impact exists. The damping section 23 is positioned consecutively to the expanded section 22 to primarily absorb impact force of the rod 42 inserted into the body 2 by impact. The deceleration section 24 secondarily absorbs the impact force.

The expanded section 22 has a diameter greater than that of the damping section 23, and has an annular stepped portion 222 at the inner side thereof.

Figure 3:
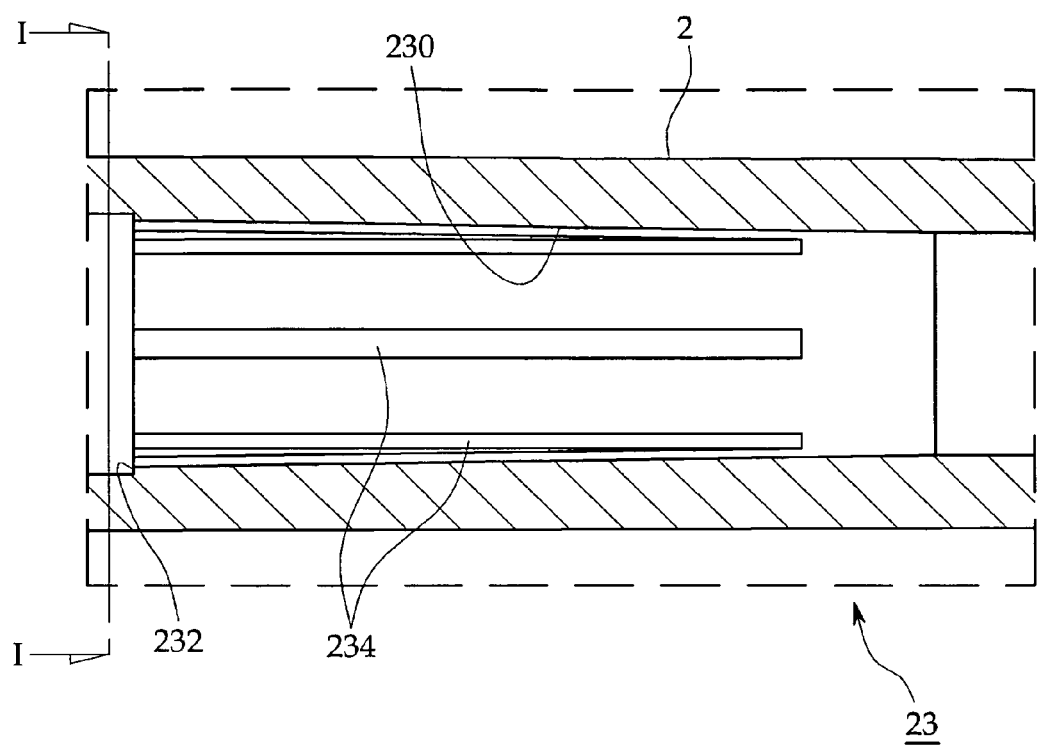
FIG. 3 is an enlarged sectional view illustrating the damping section of FIG. 2.
Figure 4:
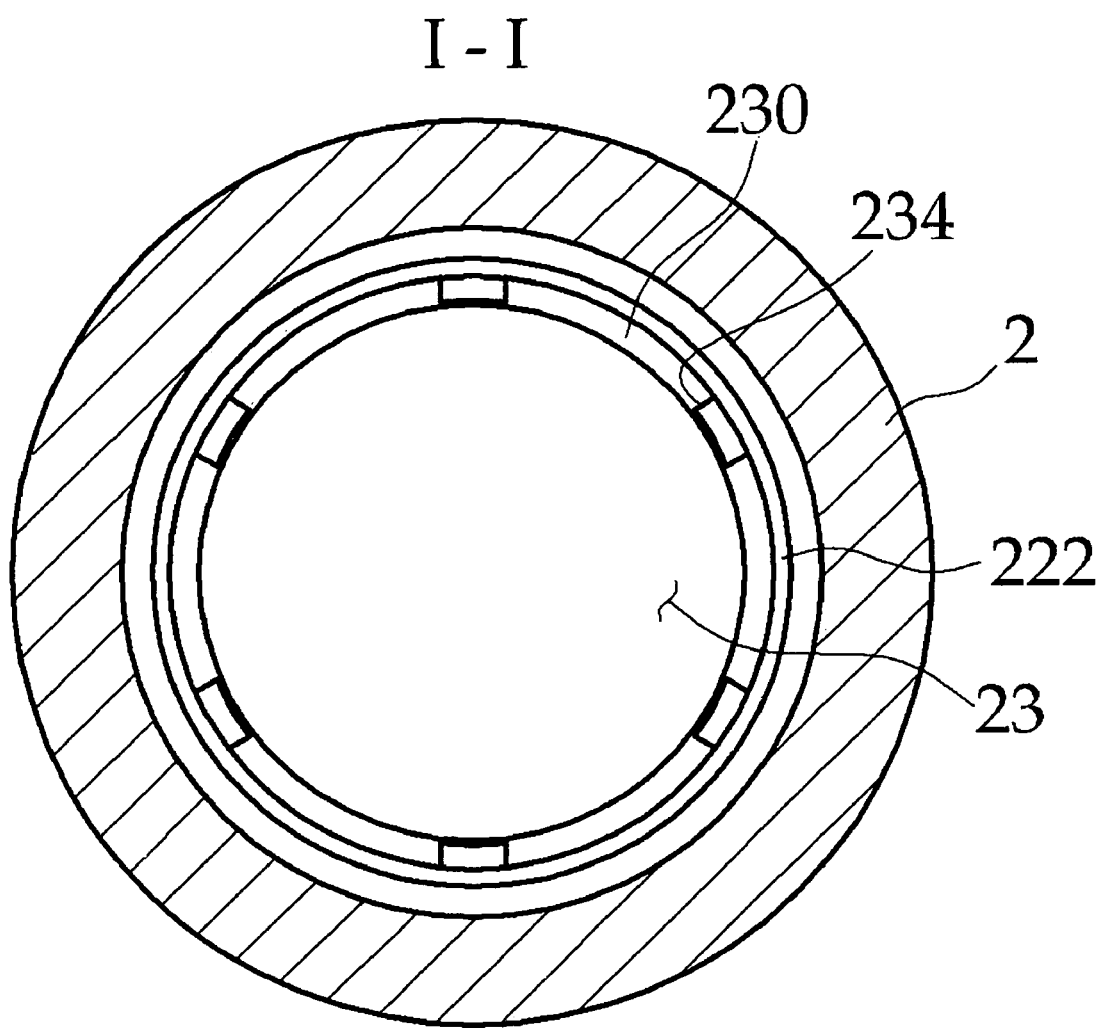
FIG. 4 is a sectional view taken along line I-I' of FIG. 3.

FIG. 3 is an enlarged sectional view illustrating the damping section of FIG. 2 and FIG. 4 is a sectional view taken along line I-I' of FIG. 3.

Referring to FIGS. 3 and 4, the damping section 23 has a tapered portion 230 in such a manner that the inner diameter of the damping section 23 is reduced from the opening to the inner side of the body 2. A plurality of first guide protrusions 234 are formed along the inner circumferential surface of the tapered portion 230 of the damping section 23.

The first guide protrusions 234 have a predetermined length, respectively, and are radially formed in the inner peripheral surface of the damping section 23.

PA diameter defined by the first guide protrusions 234 is identical to a diameter of the piston member 4 and an inner diameter of the deceleration section 24.

As can be seen from FIG. 3, the first guide protrusions 234 are tapered such that the rear end of the first guide protrusions 234 mates with the inner peripheral surface of the deceleration section 24.

Referring to again FIG. 2, the inner diameter of the deceleration section 24 is identical to the diameter defined by the first guide protrusions 234. This is for facilitating movement of the piston member 4.

Figure 5:
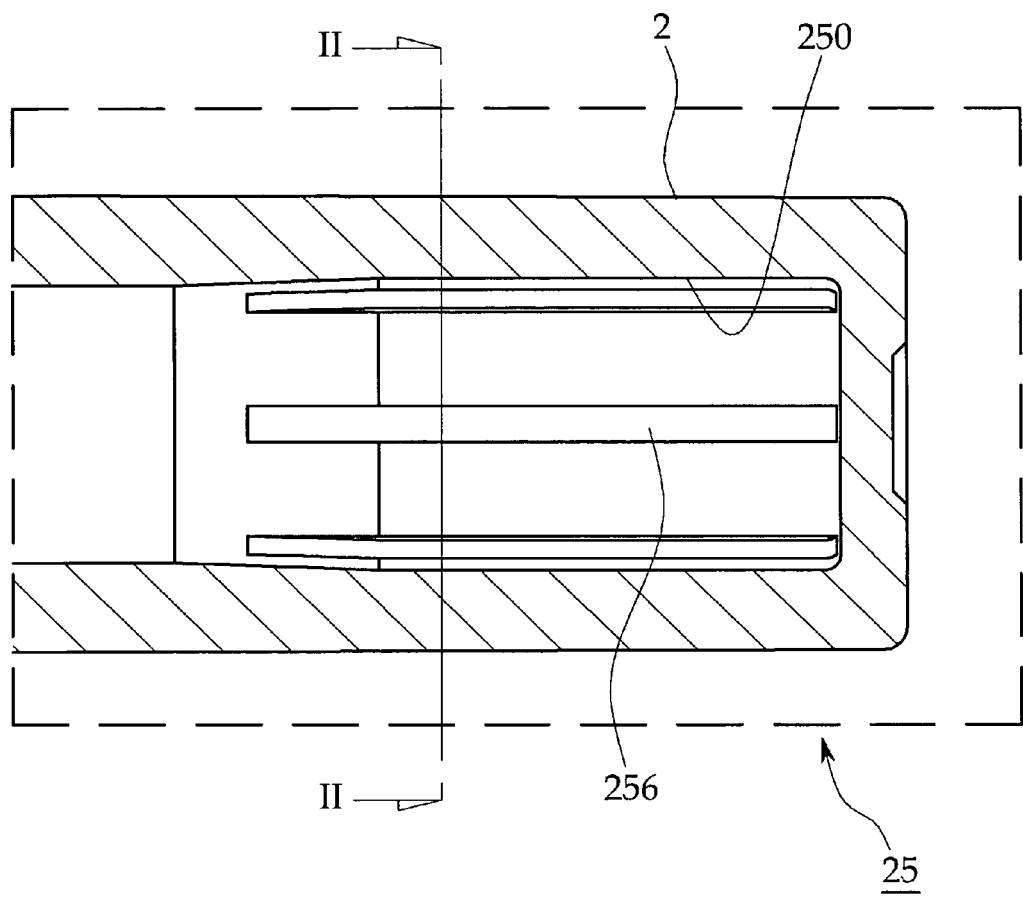
FIG. 5 is an enlarged sectional view illustrating the no-load section of FIG. 3.
Figure 6:
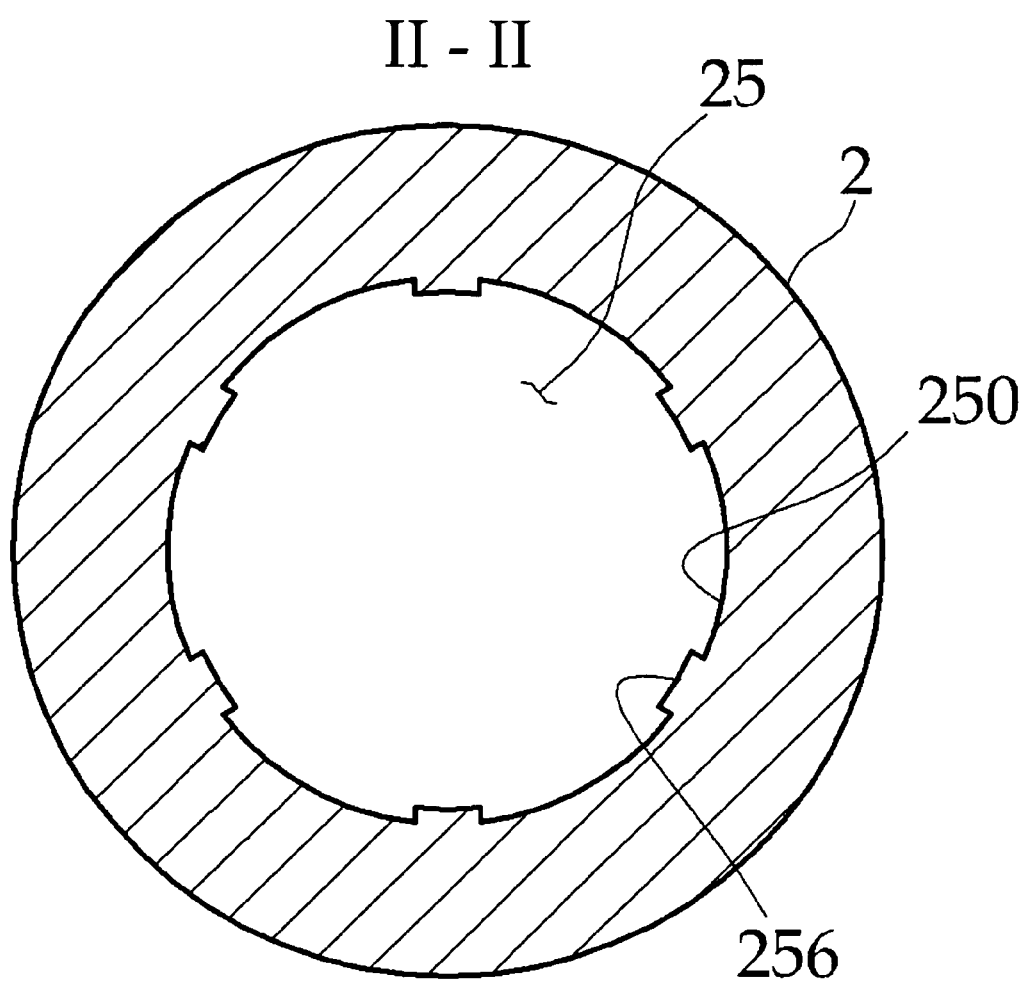
FIG. 6 is a sectional view taken along line II-II' of FIG. 5.

FIG. 5 is an enlarged sectional view illustrating the no-load section of FIG. 3 and FIG. 6 is a sectional view taken along line II-II' of FIG. 5.

Referring to FIGS. 5 and 6, the no-load section 25 has an inner wall portion 250 in which the inner diameter of the inner wall portion 250 is increased toward the rear end of the body 2. A plurality of second guide protrusions 256 are formed along the inner circumferential surface of the inner wall portion 250.

In detail, as illustrated in FIG. 5, the inner wall portion 250 includes an expanded section, which is located consecutively to the deceleration section 24, and a linear section located consecutively to the expanded section.

A diameter defined by the second guide protrusions 256 identical to a diameter of the piston member 4 and an inner diameter of the deceleration section 24.

Figure 7:
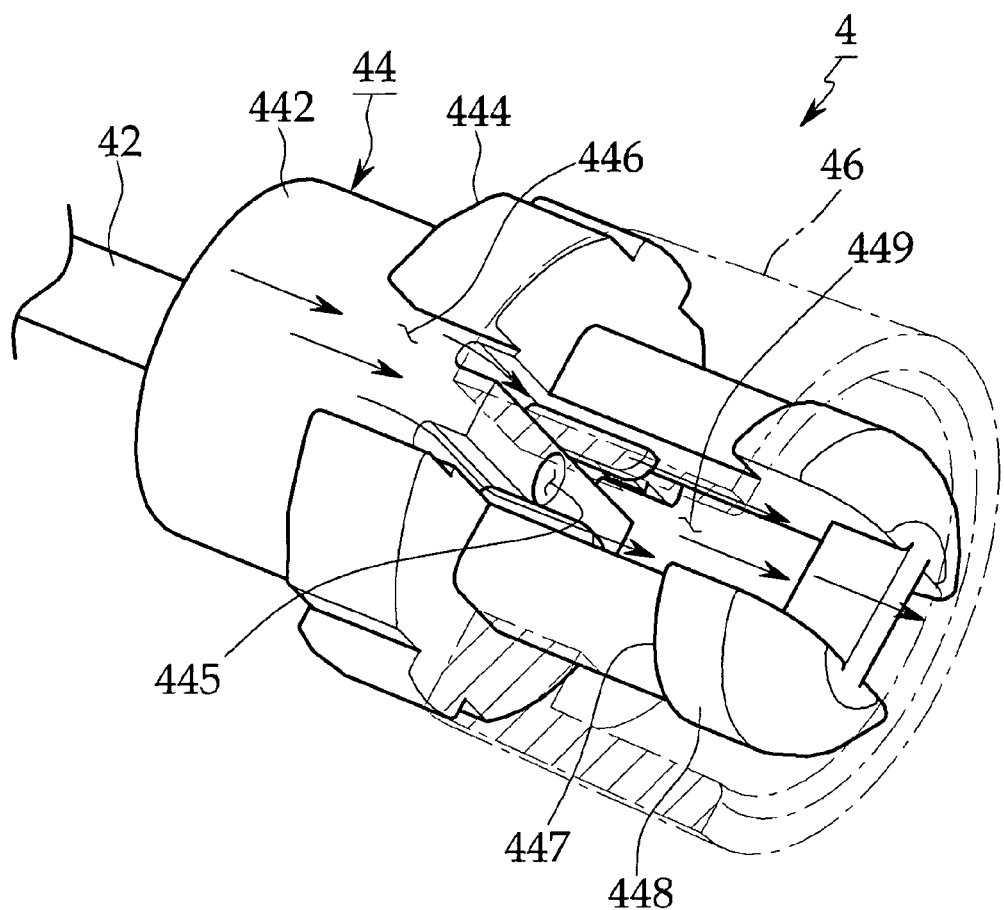
FIG. 7 is a perspective view illustrating the piston member according to an aspect of the present invention.
Figure 8:
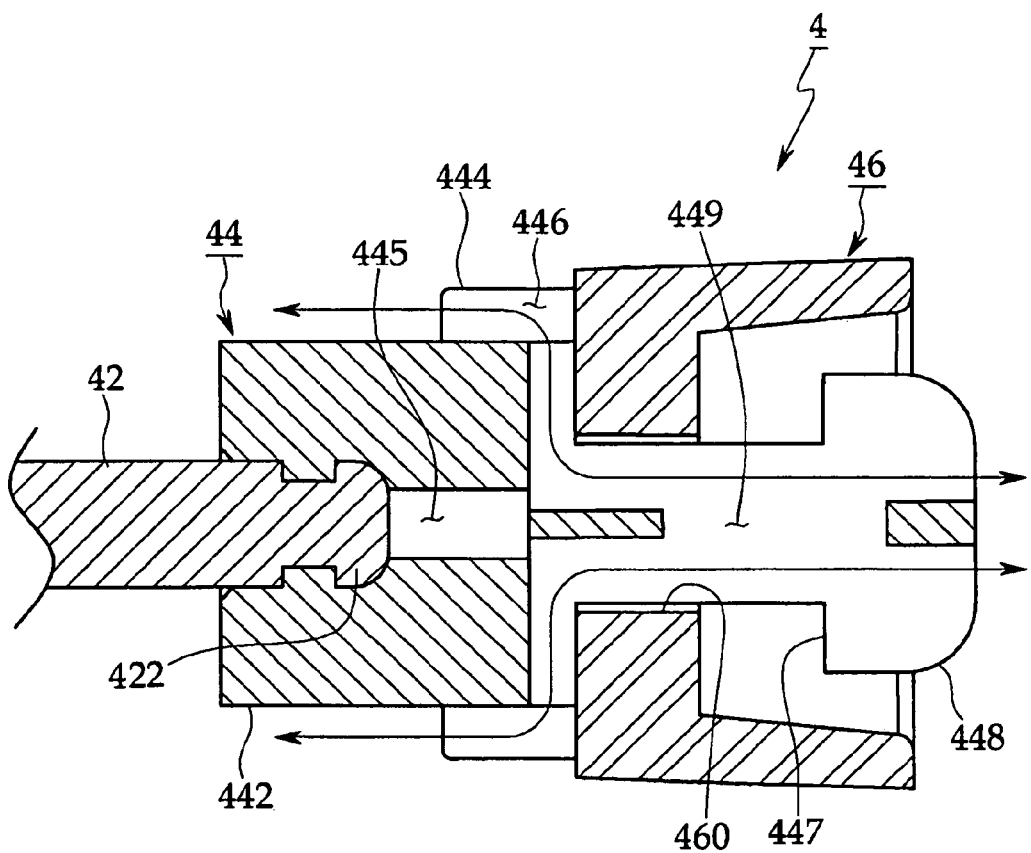
FIG. 8 is a sectional view illustrating the piston member of FIG. 7.

FIG. 7 is a perspective view illustrating the piston member and FIG. 8 is a sectional view illustrating the piston member of FIG. 7.

As illustrated in FIGS. 1, 7 and 8, the piston member 4 comprises the rod 42 having a predetermined length, and a piston support 44 and a piston 46 coupled with the rear end of the rod 42.

The rod 42 is a metal rod having a predetermined length, and has a front end bent in the form of substantially reverse-L shape and a rear end formed with an insertion protrusion 422.

The piston support 44 comprises a body 442 having a through hole 445 at the inner side thereof, an annular protrusion 444 and a fixing member 448. The annular protrusion 444 is formed on the outer peripheral surface of the body 442 and has a plurality of slits 446. The fixing member 448 is integrally formed with the rear end of the body 442. Further, the fixing member 448 has a cutting hole 449 that communicates with the slits 446, and a stepped portion 447 at the outer peripheral surface of the rear end thereof.

The piston 46 has a cylindrical shape with a closed one end, and a coupling hole 460 fitted around the fixing member 448 of the piston support 44 is formed in the closed surface. The outer peripheral surface of the piston 46 closely makes contact with the inner peripheral surface of the space section 20 of the body 2 (see FIG. 1).

Referring to again FIGS. 1 and 2, the buffering member 6 comprises an expandable member 62 expanded and contracted by elasticity, a stopper 64, a packing member 66 and a cover 68. The stopper 64 prevents separation of the expandable member 62. The packing member 66 is installed at the front end of the body 2 to prevent fluid from being leaked while closely making contact with the front end of the expandable member 62. The cover 68 closes the front opening of the body 2.

The expandable member 62 includes a cylindrical sponge and repeats compression and expansion by the fluid. The expandable member 62 prevents the body 2 from being broken by preventing the fluid-pressure from being directly applied to the cover 68.

The expandable member 62 is cut from the side to the center portion thereof such that the rod 42 can be easily coupled with the expandable member 62.

The stopper 64 is installed at the stepped portion 222 formed at the inner side of the expanded section 22 of the body 2, thereby preventing the expandable member 62 from being introduced into the body 2 even if the expandable member 62 is expanded. The stopper 64 has a disc shape and is formed with a plurality of through holes 640 to facilitate movement of the fluid.

The packing member 66 is installed adjacently to the opening of the body 2 and maintains air-tightness such that the fluid can be prevented from being leaked. The packing member 66 comprises a seal supporter 664, which closely makes contact with the inner peripheral surface of the body 2, and an oil seal 662 coupled with the seal supporter 664.

The over 68, the packing member 66, the expandable member 62 and the stopper 64 have a through hole at the center portion thereof such that the rod 42 can pass through the center portion.

Hereinafter, the coupling state and operation of the shock absorber having the structure as described above according to the present invention will be described.

First, the rod 42 is introduced into the buffering member 6 and the piston member 4.

In detail, the oil seal 662, the seal supporter 664, the expandable member 62, the stopper 64, the piston support 44 and the piston 46 are sequentially coupled with the rod 42.

Next, the piston member 4 is inserted into the body 2 through the front opening of the body 2, oil is filled in the body 2, and the opening is closed by the cover 68 such that airtight performance can be obtained therebetween, thereby completing the assembly of the shock absorber A according to the present invention.

Then, the rear end of the body 2 is fixed to the inner side of a rail (not shown) at which a drawer (not shown) is installed, and the front end of the rod 42 is fixed to the drawer.

At this time, the rod 42 can be directly connected with the drawer or can be folded in a multi-step. In addition, the rod 42 can be connected to a bracket operated in the rail.

Hereinafter, the operation of the shock absorber of the present invention according to opening and closing of the drawer will be described.

Figure 9:
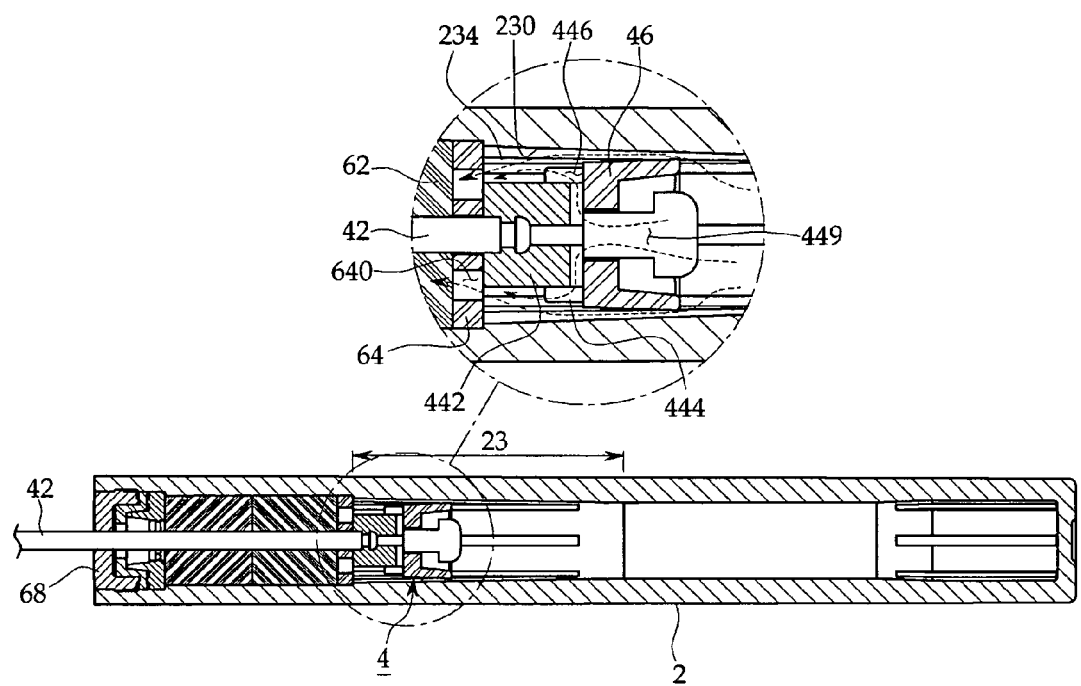
FIG. 9 is a sectional view illustrating a state in which a rod is maximally withdrawn.
Figure 10:
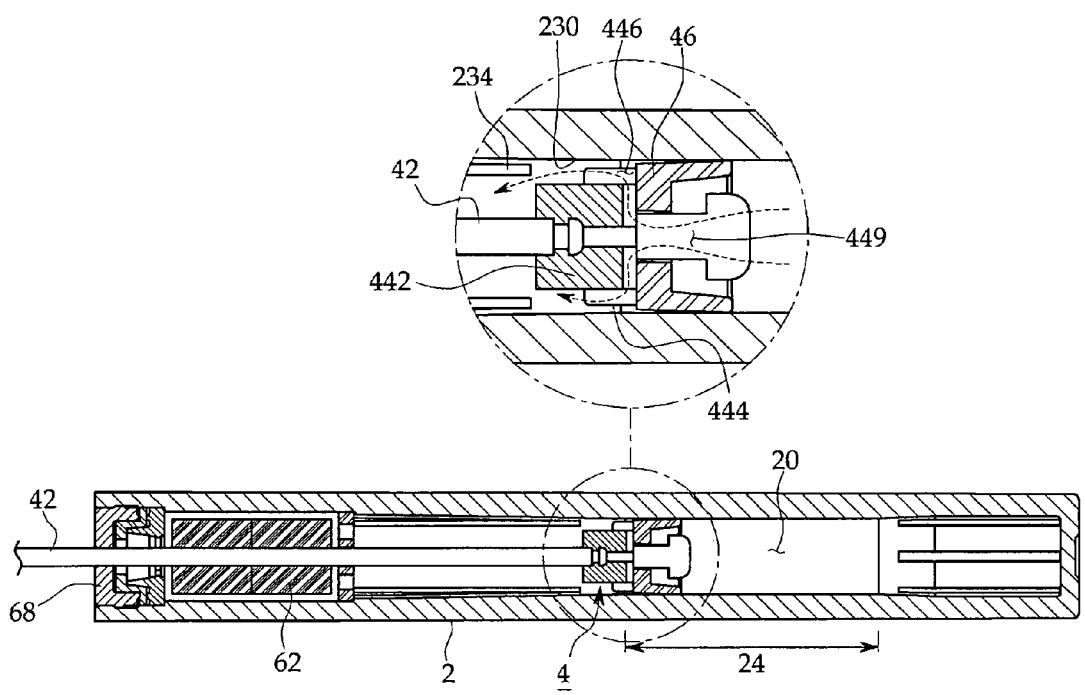
FIG. 10 is a sectional view illustrating a state in which a rod is being introduced.
Figure 11:
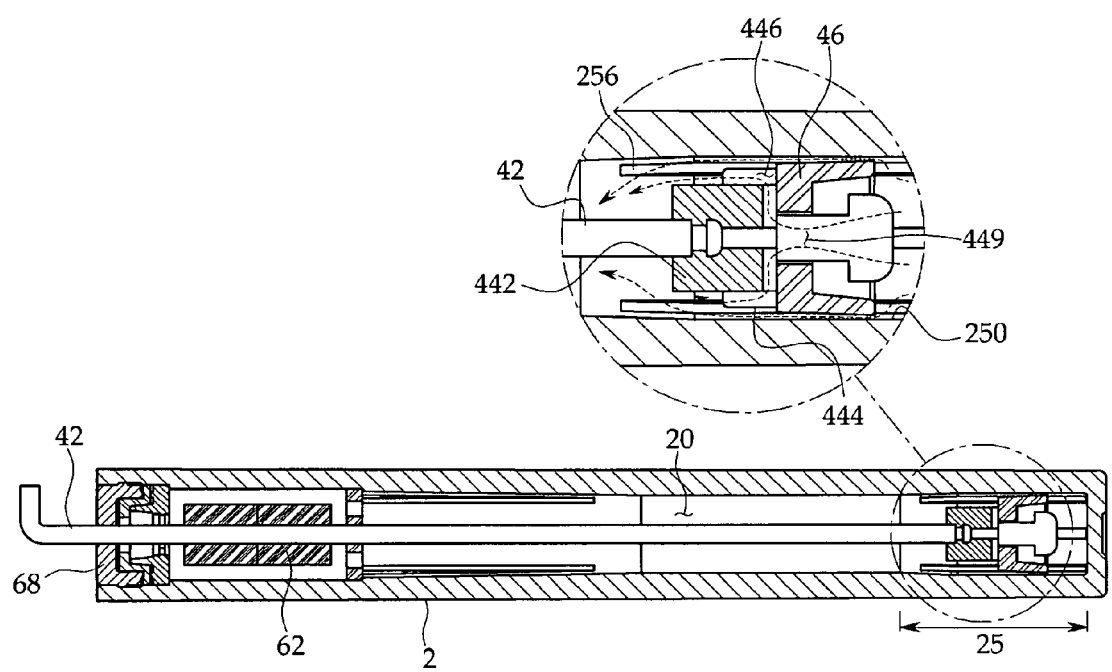
FIG. 11 is a sectional view illustrating a state in which a rod is completely introduced.

FIGS. 9 to 11 are sectional views sequentially illustrating the operation of the shock absorber according to the present invention. In detail, FIG. 9 is a sectional view illustrating a state in which the rod is maximally withdrawn, FIG. 10 is a sectional view illustrating a state in which the rod is being introduced, and FIG. 11 is a sectional view illustrating a state in which the rod is completely introduced.

In FIGS. 9 to 11, the dotted arrows indicate flow of fluid.

Referring to FIG. 9, when the drawer is withdrawn, the rod is also withdrawn, the piston member 4 stays in the damping section 23, and the fluid stays in the rear portion of the piston member 4.

In such a state, if the drawer is introduced, the rod starts to be introduced to push the fluid of the piston 46. Thus, the fluid is introduced into the cutting hole 449, which is formed in the fixing member 448 of the piston support 44, through the opening of the piston 46 by passing through the gap between the first guide protrusions 234 of the damping section 23 and the tapered portion 230, and then passes through the outer surface of the body 442 via the slits 446 of the annular protrusion 444.

Then, the fluid presses the expandable member 62 by passing through the through hole 640 of the stopper 64, so that the expandable member 62 is compressed and absorbs a part of the fluid. Thus, the fluid-pressure can be prevented from being rapidly applied to the cover 68, so that the body 2 can be prevented from being broken.

The damping section 23 receives impact force, which is generated when the drawer is closed, for the first time, and primarily reduces the impact force. In the damping section 23, the fluid flows rapidly.

Referring to FIG. 10, if the drawer is continuously closed, the rod 42 is more introduced. In this state, if the piston member 4 reaches the deceleration section 24, the impact force is reduced by about ⅓ to ⅔ of the initial impact force and the impact force is substantially removed while the fluid is passing through the deceleration section 24.

In detail, the rod 42 and the piston member 4 moves rightward while the outer peripheral surface of the piston 46 directly makes contact with the inner peripheral surface of the body 2. Further, the fluid is introduced into the cutting hole 449, which is formed in the fixing member 448 of the piston support 44, through the opening of the piston 46, and passes through the outer surface of the body 442 via the slits 446 of the annular protrusion 444. Then, the fluid moves toward the expanded section 22 and the damping section 23.

In such a state, if the piston member 4 continuously moves rightward and reaches the rear end of the deceleration section 24, the drawer is completely closed and the impact force is substantially removed.

Referring to FIG. 11, the piston member 4 moves toward the no-load section 25 by inertia, and thus the fluid moves toward the deceleration section 24.

In detail, the fluid moves through the gap formed between the inner wall portion 250 of the no-load section 25 and the second guide protrusions 256. Continuously, the fluid is introduced into the cutting hole 449, which is formed in the fixing member 448 of the piston support 44, through the opening of the piston 46, and passes through the outer surface of the body 442 via the slits 446 of the annular protrusion 444. Then, the fluid moves toward the deceleration section 24.

Then, if the drawer is opened, the rod 42 moves leftward and the piston member 4 moves leftward by attraction generated instantaneously, so that the fluid is introduced into the no-load section 25 through the cutting hole 449, which is formed in the fixing member 448 of the piston support 44, via the slits 446 of the annular protrusion 444.

At this time, the fluid is instantaneously introduced into the no-load section 25 at the highest pressure. However, since the expanded inner wall portion 250 is formed in the inner surface of the no-load section 25, the fluid-pressure can be distributed and reduced. Thus, the impact force can be attenuated.

Then, as the drawer is opened, the rod 42 and the piston member 4 sequentially pass through the deceleration section 24, the damping section 23 and the expanded section 22. Thus, the fluid moves leftward.

The invention claimed is:

1. A shock absorber for a drawer comprising:
    a body filled with fluid;
    a piston member inserted into the body while being coupled with a rod; and
    a buffering member installed in the body to prevent the body from being broken by receiving pressure change of fluid when the piston member moves forward and backward,
    wherein the body comprises:
        a front end at which an opening is formed;
        a closed rear end; and
        a space section filled with the fluid,
    wherein the space section of the body comprises:
        an expanded section in which the buffering member is installed adjacently to the opening;
        a damping section positioned consecutively to the expanded section to primarily absorb impact force of the rod inserted into the body by impact;
        a deceleration section for secondarily absorbing the impact force; and
    a no-load section in which no impact exists,
    wherein the damping section has a tapered portion in such a manner that the inner diameter of the damping section is reduced from the opening to an inner side of the body, and a plurality of first guide protrusions are formed on the tapered portion,
    wherein the piston member comprises:
    a piston support coupled with a rear end of the rod; and
    a piston,
        wherein the rod is a metal rod having a predetermined length, and has a front end bent in a form of substantially reverse-L shape and a rear end formed with an insertion protrusion, wherein the piston support comprises:
a body having a through hole at an inner side thereof;
an annular protrusion formed on an outer peripheral surface of the body and having a plurality of slits; and
a fixing member integrally formed with a rear end of the body, and having a cutting hole, which communicates with the slits, and a stepped portion at an outer peripheral surface of a rear end thereof,
wherein the piston has a cylindrical shape with a closed one end, and a coupling hole, which is fitted around the fixing member of the piston support, in the closed surface.

2. The shock absorber for a drawer according to claim 1, wherein the expanded section has a diameter greater than a diameter of the damping section, and has an annular stepped portion at an inner side thereof.

3. The shock absorber for a drawer according to claim 1, wherein the no-load section has an inner wall portion in which the inner diameter of the inner wall portion is increased toward the rear end of the body, and a plurality of second guide protrusions are formed on the inner wall portion.

4. The shock absorber for a drawer according to claim 3, wherein a diameter of the inner wall portion defined by the second guide protrusions is identical to an inner diameter of the deceleration section.

5. The shock absorber for a drawer according to claim 1, wherein the buffering member comprises:
an expandable member expanded and contracted by elasticity;
a stopper to prevent separation of the expandable member;
a packing member installed at a front end of the body to prevent fluid from being leaked while closely making contact with a front end of the expandable member; and
a cover to close a front opening of the body.

6. The shock absorber for a drawer according to claim 5, wherein the expandable member comprises a sponge.

7. The shock absorber for a drawer according to claim 1, wherein a diameter of the damping section defined by the first guide protrusions is identical to an inner diameter of the deceleration section.

* * * * *